US006576316B2

(12) United States Patent
Simons et al.

(10) Patent No.: US 6,576,316 B2
(45) Date of Patent: Jun. 10, 2003

(54) SOUND ABSORBING AND VIBRATION DAMPING METAL STRIP, MOLDING, AND METHOD OF PRODUCING A SOUND ABSORBING AND VIBRATION DAMPING METAL STRIP

(75) Inventors: Jan-Peter Simons, Göttingen (DE); Hans-Eckard Weitsch, Göttingen (DE); Fred-Roderich Pohl, Bovenden (DE)

(73) Assignee: Alcan Deutschland GmbH, Göttingen (DE)

( * ) Notice: Subject to any disclaimer, the term of this patent is extended or adjusted under 35 U.S.C. 154(b) by 0 days.

(21) Appl. No.: 09/891,723

(22) Filed: Jun. 26, 2001

(65) Prior Publication Data

US 2002/0045018 A1 Apr. 18, 2002

(30) Foreign Application Priority Data

Jun. 28, 2000 (DE) .......................................... 100 31 318

(51) Int. Cl.⁷ .............................................. B32B 15/04
(52) U.S. Cl. .................... 428/40.1; 428/40.9; 428/41.1; 428/41.4; 428/41.7; 428/344; 428/352; 428/354; 428/457
(58) Field of Search ................................ 428/40.1, 40.9, 428/41.1, 41.4, 41.7, 344, 352, 354, 457

(56) References Cited

U.S. PATENT DOCUMENTS 4,627,635 A * 12/1986 Koleda ........................ 280/602
5,063,098 A 11/1991 Niwa et al. .................... 428/76

FOREIGN PATENT DOCUMENTS

| DE | 2609763 | 9/1977 |
| DE | 2909802 | 9/1980 |
| DE | 4022238 | 1/1991 |
| DE | 29803111 | 7/1998 |
| FR | 2321386 | 3/1977 |
| GB | 1562727 | 3/1980 |
| GB | 1562783 | 3/1980 |

OTHER PUBLICATIONS

12/77 WPIL–(C) Derwent, Abstract of JP 09–125560 A, May 13, 1997.
16/77 WPIL–(C) Derwent, Abstract of FR 2732099 A, Sep. 27, 1996.
25/77 WPIL–(C) Derwent, Abstract of JP 05–220883 A, Aug. 31, 1993.
62/77 WPIL–(C) Derwent, Abstract of RD 216014 A, Apr. 10, 1982.

* cited by examiner

Primary Examiner—Nasser Ahmad
(74) Attorney, Agent, or Firm—Cooper & Dunham LLP

(57) ABSTRACT

A metal strip, more particularly a metal strip for producing vibration damping moldings, is provided with a layer of adhesive viscoelastic plastics and permits coiling and comprises an anti-adhesive film-type coating.

In a method of producing a metal strip, the metal strip is preferably degreased, preferably stretched, possibly pretreated and coated one-sided with an adhesive viscoelastic plastics. In addition, an anti-adhesive film is applied to the metal strip.

14 Claims, No Drawings

SOUND ABSORBING AND VIBRATION DAMPING METAL STRIP, MOLDING, AND METHOD OF PRODUCING A SOUND ABSORBING AND VIBRATION DAMPING METAL STRIP

BACKGROUND OF THE INVENTION

1. Field of the Invention

The invention relates to a metal strip as set forth in the preamble of claim 1 and more particularly to a metal strip for producing moldings acting vibration damping when compounded with vehicle body parts, said metal strip being provided with a layer of adhesive viscoelastic plastics and permitting coiling. The invention relates furthermore to stackable blanks and moldings produced from a metal strip as well as to a method of producing a metal strip as set forth in the preamble of claim 11.

For cladding and/or stiffening components exposed to vibration, particularly sheet metal is employed in vehicle body building. In automotive engineering such sheet metal serves, for example, vibration damping fenders, hoods, doors, etc. The sheet metal items cannot always be stiffened by beading, embossing, etc., they thus tending to vibrate and correspondingly transmit structure-borne sound when excited from without. This sound emission occurs at frequencies which are a nuisance to human hearing. Apart from this, the vibrations may also result in material fatigue, cracks and fractures.

2. Prior Art

One popular possibility of damping vibration in vehicle body parts is to use blanks of plastics and/or bitumen compounds (known generally as sound absorbing mats) which are bonded, fused or coated to the components incurring vibration. Apart from the fact that these sound absorbing mats are relatively heavy, they lack visual appeal. In addition, although the sound absorbing mats are flame-retardant, they are nevertheless flammable. On top of this, there is a risk of them becoming brittle and fractured due to aging as well as due to temperature cycling. Disposing or recycling sound absorbing mats or the compound product is also a problem, especially since the sound absorbing mats may contain toxic substances.

As an alternative, damping compounds are known for coating components exposed to vibration. However, these have the same drawbacks as the sound absorbing mats. In addition, they pose an additional environmental pollution problem due to the solvent used in spray coating.

Known furthermore for vibration damping are sandwich systems—as disclosed for example by U.S. Pat. No. 5,063,098 or DE-OS 26 09 763 in forming the subject matter of the preamble of the present claims 1 and 11—comprising at least two metal sheets sandwiching layers of plastics. It is especially in making use of viscoelastic plastics that high values for damping structure-borne sound are attainable with these sandwich metal sheets. However, the disadvantage of these sandwich systems is the high weight and price due to the metal layers. Apart from this, sandwich metal sheets are usually difficult to mold and thus three-dimensional moldings can only be achieved with difficulty therewith.

In conclusion, another possibility of vibration damping is to fabricate the actual components exposed to vibration of materials having a high inherent damping effect, e.g. of plastics. The drawback in this case, however, is the high price and problems in recycling. Apart from this, these plastics parts usually provide only low energy absorption in a crash situation.

SUMMARY OF THE INVENTION

The invention is based on the objective of providing a metal strip, a blank or molding produced therefrom and a method of producing a metal strip, with the aid of which the vibration damping of sheet metal parts can be enhanced.

This objective is achieved by a metal strip in accordance with a first aspect of the invention as set forth in claim 1.

In accordance therewith, a metal strip is provided with a layer of adhesive viscoelastic plastics. The metal strip comprises an anti-adhesive film-type coating so that it can be coiled for storage and transport purposes without the adhesive plastics sticking to the side of the metal strip facing away from the adhesive.

By processing the metal strip with dies or molds, flat or multidimensional moldings or metal pads are obtained which can be bonded to components exposed to vibration. These metal pads excel by their low weight since they comprise merely a single layer of metal. Depending on the thickness of the pads (approx. 0.05 to 1.0 mm, preferably 0.1 to 0.3 mm) and depending on the material used, the weight is in the range 135 to 2,700 g/m$^2$.

The metal pads can be put to use for vibration damping body and sheet metal structures on air, land and sea vehicles as well as on machine parts, they being just as suitable for use on appliances exposed to high vibration with a corresponding noise emission (e.g. shrub shredders, lawn-mowers).

Another advantage of the metal strip in accordance with the invention is its excellent recycling ability. No problem recycling of a component bonded with a metal pad in accordance with the invention is achieved especially by advantageously pairing the metals accordingly, for example, by using an aluminum pad on aluminum or a steel pad on steel.

The metal strip in accordance with the invention also features advantageous properties as regards flammability, metals in general being non-flammable. The damper adhesive, preferably in the range 10 to 100$\mu$ m, constitutes no risk since it is preferably formulated on the basis of an acrylic resin.

Apart from this, it is especially when employing aluminum pads that excellent means of shaping are assured so that even multidimensional shaped parts such as fenders, hoods, doors, roof panels, etc can all be bonded optimally with the metal pads.

Yet another advantage afforded by the metal pads in accordance with the invention is their resistance to corrosion. The damper adhesive is chemically neutral and prevents contact corrosion as could otherwise occur, for example, between door panel and metal pad. Thus it is also possible to soundproof a steel door with a metal pad of aluminum in accordance with the invention.

In conclusion, there is no environmental hazard in producing and using the metal pads in accordance with the invention, since the pads contain no toxic substances.

The metal strip in accordance with the invention can also be precoated colored, for example in a coil-coating process to thus permit production of metal pads already colored. In this case it is also conceivable to coat or film coat the metal strip, and thus the pads formed therefrom, reflective, fluorescent, phosphorescent or luminescent so that, for example, the inner side of the trunk lid can be provided with a single or multicolor metal pad in providing a warning indication by the open trunk lid when the vehicle has a breakdown or has been involved in a crash.

Preferred further embodiments of the metal strip in accordance with the invention read from the further claims.

DETAIL DESCRIPTION

There are basically two possibilities of arranging the plastics layer and the anti-adhesive film. The first consists of applying the adhesive plastics layer and the anti-adhesive film superimposed to the same side of the metal strip. In this arrangement the anti-adhesive film is preferably made of paper, plastics or aluminum foil. Whilst the metal strip is being processed into metal pads the adhesive plastics layer is optimally protected by the cover film which is simply peeled off prior to bonding a metal pad to a component exposed to vibration.

As an alternative, it is possible to apply the adhesive plastics layer and the anti-adhesive film to differing sides of the metal strip. In this case the anti-adhesive film preferably consists of a release lacquer. This variant has the advantage that there is no need to peel off and subsequently dispose the cover material when bonding the metal pad.

There are likewise several possibilities for configuring the viscoelastic plastics layer. For one thing, the viscoelastic plastics layer may be configured self-adhesive in thus enabling an adhesive and simultaneous damping layer to be applied to the metal strip in a single operation. However, it is just as possible to first apply the viscoelastic plastics layer before then coating it with an adhesive.

There is furthermore the possibility of combining a double-sided viscoelastic structured adhesive strip—consisting of e.g. a plastics strip as the substrate film, provided with a viscoelastic and bonding adhesive on both sides—with a metal strip to form the strip in accordance with the invention, from which the metal pads in accordance with the invention can be produced.

Tests have indicated that it is good practice to use aluminum, an aluminum alloy, zinc or steel as the material for the metal strip. These materials excel in corresponding thickness and structure by their low weight and good forming properties.

Achieving the aforementioned objective forming the basis of the invention is done in accordance with a second aspect of the invention by the method as set forth in claim 11. Preferred further embodiments of the method read from the further claims, the method features of which substantially correspond to the embodiments of the metal strip produced thereby as described above.

What is claimed is:

1. A metal pad for producing vibration damping moldings, comprising a single metal strip one surface of which is provided with a layer of adhesive viscoelastic plastics for bonding said vibration damping moldings to components exposed to vibration, said metal pad permitting coiling and further comprising an anti-adhesive film coating.

2. The metal pad for producing vibration damping moldings as set forth in claim 1, wherein said adhesive plastics layer and said anti-adhesive film are provided on the same side of said single metal strip.

3. The metal pad for producing vibration damping moldings as set forth in claim 2, wherein said anti-adhesive film is a cover film.

4. The metal pad for producing vibration damping moldings as set forth in claim 1, wherein said adhesive plastics layer and said anti-adhesive film are provided on differing sides of said single metal strip.

5. A metal pad for producing vibration damping moldings, comprising a single metal strip one surface of which is provided with a layer of adhesive viscoelastic plastics for bonding said vibration damping moldings to components exposed to vibration, the metal pad permitting coiling and further comprising an anti-adhesive film coating, wherein said adhesive plastics layer and said anti-adhesive film are provided on differing sides of said single metal strip and wherein said anti-adhesive film is a lacquer film.

6. The metal pad for producing vibration damping moldings as set forth in claim 1, wherein said viscoelastic plastics layer is self-adhesive.

7. The metal pad for producing vibration damping moldings as set forth in claim 1, wherein said viscoelastic plastics layer is coated with an adhesive.

8. The metal pad for producing vibration damping moldings as set forth in claim 1, wherein said viscoelastic plastics layer is a double-sided viscoelastic structured adhesive strip.

9. The metal pad for producing vibration damping moldings as set forth in claim 1, wherein said single metal strip is made of aluminum, an aluminum alloy, zinc or steel.

10. The metal pad for producing vibration damping moldings as set forth in claim 5, wherein said single metal strip is made of aluminum, an aluminum alloy, zinc or steel.

11. A mounding produced by processing a metal pad as set forth in claim 1 with molds and/or dies.

12. A molding produced by processing a metal pad as set forth in claim 5 with molds and/or dies.

13. The metal pad for producing vibration damping moldings as set forth in claim 3, wherein said cover film is a film of paper or plastics or a coated aluminum foil or a mixture thereof.

14. The metal pad for producing vibration damping moldings as set forth in claim 8, wherein said double-sided viscoelastic structured adhesive strip is a plastics strip provided with a viscoelastic and bonding adhesive on both sides.

* * * * *